United States Patent [19]

Erdman et al.

[11] Patent Number: 5,542,279
[45] Date of Patent: Aug. 6, 1996

[54] METHOD OF INCORPORATING WIDE TOLERANCE SET POINT POTENTIOMETERS INTO DEVICES WITH FIXED ORIENTATION SETPOINT INDICATOR SCALES

[75] Inventors: John L. Erdman, Eden Prairie; Marcus D. Stoner, Minnetonka, both of Minn.

[73] Assignee: Honeywell Inc., Minneapolis, Minn.

[21] Appl. No.: 316,584

[22] Filed: Sep. 30, 1994

[51] Int. Cl.⁶ .............................. G01D 18/00; G01R 35/00
[52] U.S. Cl. ................................ 73/1 R; 29/595; 324/74
[58] Field of Search ................................ 73/1 R; 324/74, 324/601; 29/595

[56] References Cited

U.S. PATENT DOCUMENTS

| | | | |
|---|---|---|---|
| 2,300,803 | 11/1942 | Pattee | 73/1 R |
| 2,681,435 | 6/1954 | Lurie | 73/1 R X |
| 2,767,375 | 10/1956 | Schramm | 73/1 R X |
| 3,001,131 | 9/1961 | Oliver | 73/1 R X |
| 3,181,063 | 4/1965 | Ullrich | 73/1 R X |
| 3,579,107 | 5/1971 | Buttenhoff et al. | 324/157 |
| 3,609,376 | 9/1971 | Seely et al. | 73/1 R X |
| 4,142,149 | 2/1979 | Nador | 324/157 |
| 4,163,938 | 8/1979 | Moore | 73/1 R X |
| 4,418,339 | 11/1983 | Spofford, Jr. et al. | 340/595 |
| 4,646,070 | 2/1987 | Yasuhara et al. | 73/53.07 X |

OTHER PUBLICATIONS

*Patent Abstracts of Japan*: Grp. p. 1468; vol. 17, No. 16; ABS pub. date Jan. 12, 1993 (4–244916) "Indication Error Compensation Device of Meter Needle".

*Primary Examiner*—Thomas P. Noland
*Attorney, Agent, or Firm*—Charles L. Rubow

[57] ABSTRACT

A manufacturing method for control devices which incorporate potentiometers whose resistance characteristics other than linearity are subject to unit-to-unit variations, and in which a wiper positioning knob in cooperation with a fixed scale indicates the set point for the controlled parameter, the method involving mounting the potentiometer in its theoretically ideal orientation in the device, affixing the knob to the potentiometer so that a pointer thereon points to the desired location on the device for a predetermined point on the scale when the wiper is positioned to control the parameter to the set point corresponding to the predetermined point on the scale, and marking the scale on the device so that the predetermined point on the scale is at its desired location on the device.

9 Claims, 1 Drawing Sheet

METHOD OF INCORPORATING WIDE TOLERANCE SET POINT POTENTIOMETERS INTO DEVICES WITH FIXED ORIENTATION SETPOINT INDICATOR SCALES

BACKGROUND OF THE INVENTION

The present invention relates generally to manufacturing methods for control devices of the type in which a controlled parameter set point is determined by the position of a potentiometer wiper and in which the set point is indicated by a movable element associated with the wiper positioning member in cooperation with a fixed element on the device, and more particularly to a method for manufacturing such devices incorporating wide tolerance potentiometers and fixed indicator elements having predetermined orientations which are uniform from device to device.

A wide variety of control devices are known in which a parameter is controlled to a manually entered set point. Depending on the type of control device, the set point may be entered through any of several kinds of mechanisms. In electrical systems, common input mechanisms include potentiometers, switch keypads and digital encoders.

Particularly in high volume consumer devices, cost of the input mechanism is an important consideration. Using presently available technology, ceramic metal (cermet) potentiometers can be produced quite inexpensively. Particularly when the auxiliary elements which may be required with keypad or digital encoder mechanisms are considered, low end cermet potentiometers provide for the lowest cost input mechanisms in many applications.

A complicating factor in many applications is that the lower cost cermet potentiometers are typically wide tolerance devices because, with the materials and assembly techniques used, it is difficult to manufacture such potentiometers without significant part-to-part variations. A single model of a typical low cost cermet potentiometer may exhibit full scale resistance variations of greater than 20% and linearity variations of greater than 10%. Depending on the application, input mechanisms exhibiting such variations may be undesirable or totally unacceptable.

Potentiometers having much tighter tolerance specifications are available. However, potentiometers exhibiting part-to-part consistency within a 1% tolerance typically cost in excess of four times the cost of inexpensive potentiometers. At that cost, a membrane switch keypad or digital encoder with any necessary auxiliary elements becomes relatively more cost effective.

Although a potentiometer model of inexpensive cermet construction may exhibit substantial part-to-part variations, it has been found that each individual potentiometer is monotonic and linear over its range except for the regions of the end point contact metalization pads. Thus, complications introduced by nonlinearities can be avoided through the use of designs which exclude usage of the nonlinear end regions. Also, full scale resistance variations can be ignored or easily accommodated if such potentiometers are used as voltage dividers rather than variable resistors.

A further advantage of a potentiometer over a switch keypad in certain applications is that the keypad, per se, does not provide an indication of the commanded set point. If the commanded set point is to be displayed, an auxiliary display unit must be provided. Also, a switch keypad in conjunction with a microprocessor is inherently at least somewhat volatile, and could lose the commanded set point if electrical power is lost.

In accordance with the foregoing discussion, there are many applications in which an inexpensive cermet potentiometer would form a quite acceptable input mechanism if part-to-part variations, nonlinearities in resistance characteristics at the end point contact regions and full scale resistance variations could be avoided or accommodated. The applicants have devised a device design and method of manufacture which satisfactorily addresses these issues to permit the use of inexpensive, wide tolerance potentiometers in a manner which will provide satisfactory performance and acceptable human factors function and appearance for the operator interface.

SUMMARY OF THE INVENTION

The invention is a method of manufacturing control devices of the type in which a controlled parameter set point is determined by the position of the wiper on the resistive element of a potentiometer and in which the set point is indicated by a movable element associated with the wiper positioning member in cooperation with a fixed position element, the method basically comprising the steps of determining a first wiper position at which the parameter is controlled to a first set point corresponding to a first predetermined point on an indicator scale, coupling the wiper positioning member to the potentiometer so that the movable element associated with the wiper positioning member is in predetermined positional relationship with a desired location on the device, and marking the scale so that the predetermined point on the scale is at the desired location. The inventive method may include the additional steps of determining the range of positions of the movable element corresponding to the desired range of set points for the controlled parameter, and marking the scale so that set point indicia of the scale correspond to a linear set point function with the ends of the scale substantially coinciding with the ends of the range of positions of the movable element. The first predetermined point on the scale may correspond to the midpoint of the range of set points for the controlled parameter.

DESCRIPTION OF THE PREFERRED EMBODIMENT

Figure 1:
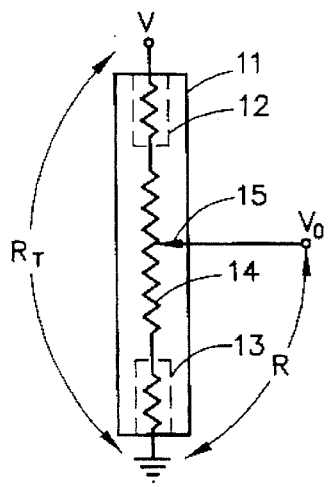
FIG. 1 is a schematic representation of a potentiometer identifying parameters to be used in describing potentiometer resistance characteristics which are significant to the applicants' invention.
Figure 2:
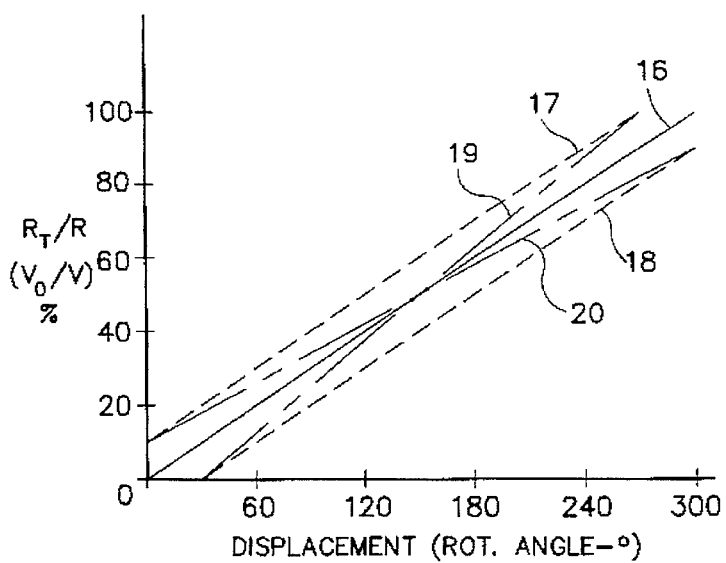
FIG. 2 is a graphical representation of the resistance characteristics of typical inexpensive cermet potentiometers usable in the method of the applicants' invention.

For purposes of discussion relating to FIGS. 1 and 2, it will be assumed that the potentiometer is being applied ratiometrically, and the characteristics discussed are ratiometric characteristics. As will be discussed hereinafter, the reason for applying the potentiometer in this manner is to accommodate unit-to-unit potentiometer variations in full scale resistance.

Although the discussion of FIGS. 1 and 2 will be primarily in terms of resistance ratios, the discussion is equally applicable to voltage ratios, i.e., the ratio of the voltage between the wiper and one end contact of the resistive element versus the voltage between opposite end contacts of the element.

Finally, for convenience in the discussion, it is assumed that the potentiometer is a rotary potentiometer in which a rotatable knob is used to vary the position of the wiper on the resistive element. It is, however, pointed out that the discussion and the invention are equally applicable in connection with slide potentiometers in which the position of the wiper can be varied linearly along the resistive element, and the wiper is positioned by means of a translatable knob or lever.

In FIG. 1, reference numeral 11 identifies the resistive element of a potentiometer. The resistive element is shown as comprising three portions, 12, 13 and 14, of which 12 and 13 are resistive components associated with end point contact metalization pads on the resistive element. In the vicinity of the pads, the resistance versus distance from the pad may be highly nonlinear. Resistive portion 14 represents a portion of the resistive element away from the vicinity of the contact pads in which the resistance versus distance is a relatively linear function.

Reference numeral 15 identifies a wiper which is positionable along resistive element 11. For purposes of the present invention, wiper 15 is considered to be positionable only along portion 14 of the resistive element to avoid nonlinearities and complications associated with the end point contacts. As further shown in FIG. 1, $R_T$ is the total resistance between the end points of resistive element 11 and R is the resistance between one end point of resistive element 11 and wiper 15.

The graphical representation of FIG. 2 shows the relationship between displacement of the wiper in terms of degrees of rotation from end stops of rotary wiper movement versus $R_T/R$ resistance ratio percentage (or $V_0/V$ voltage ratio percentage). The line identified by reference numeral 16 represents the ideal relationship between displacement and resistance or voltage ratio percentage. Dashed lines 17 and 18 represent tolerance limits of the displacement versus resistance ratio or voltage ratio percentage. Limits 17 and 18 specifically relate to a potentiometer whose tolerance is plus or minus 10%.

The worst case situations in applying such a potentiometer occur with the resistance ratio (voltage ratio) characteristic represented by lines 19 and 20. In a potentiometer whose characteristics are represented by line 19, as the wiper is rotated from its 0° position, there is no change in the resistance ratio during the first or last 30° of rotation of the wiper. Conversely, in a potentiometer having the characteristics represented by line 20, upon commencement of rotation of the wiper from its 0° position the resistance (voltage) ratio immediately jumps to 10%. There is a similar jump in resistance (voltage) ratio at the other end of wiper travel.

In order to avoid end point contact problems, the range of wiper positions is limited to those corresponding to resistance ratios between the maximum usable resistance ratio percentage (100% minus the linearity tolerance percentage) and the minimum usable resistance ratio (linearity tolerance percentage). In the example shown in FIG. 2, the usable range of potentiometer positions is between 30° and 270°.

Figure 3:
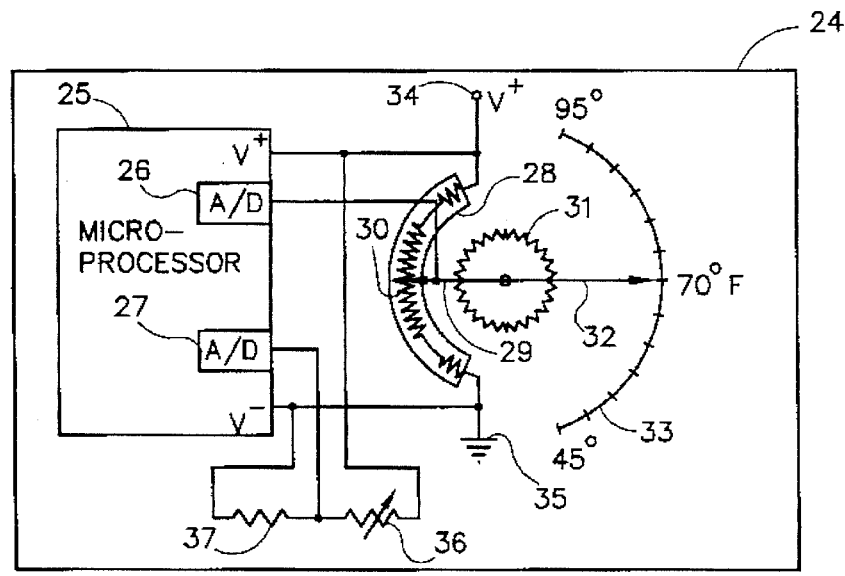
FIG. 3 is a general block diagram of an electronic thermostat representative of the type of control device in which a potentiometer having the characteristics illustrated in FIG. 2 can be satisfactorily incorporated.

In the general block diagram of FIG. 3, reference numeral 24 generally identifies an electronic thermostat as an example of a control device in connection with which the applicants' invention can be beneficially employed. Thermostat 24 includes a microprocessor 25 having a first analog-to-digital (A/D) converter 26 for receiving an analog voltage whose magnitude is indicative of the desired set point for a controlled parameter (temperature). Microprocessor 25 also includes a second A/D converter 27 for receiving an analog voltage whose magnitude is indicative of sensed temperature in the space of interest. Although a microprocessor is specifically referred to for simplifying the present description, it should be understood that the necessary functions can be satisfactorily performed by other means, such as custom integrated circuits, discrete component circuits, etc.

Reference numeral 28 identifies the resistive element of a rotary potentiometer whose wiper 29 may be positioned along a portion 30 of the resistive element. Portion 30 excludes the regions of the end point contact metalization pads.

The position of wiper 29 may be varied by means of a knob 31 having a pointer or other movable element 32 thereon which cooperates with a stationery scale or other fixed-position element 33 on the housing of thermostat 24 to provide a visual indication of the input set point. An equivalent function could be performed by reversing the positions of the pointer and scale, or by locating the rotatable scale behind a stationary window. Further, it should be apparent that the rotatable pointer or scale could be coupled to the wiper through a gear or linkage arrangement.

Resistive element 28 of the potentiometer is connected between a supply voltage source 34 and a source of reference potential or ground 35. Thus, in operation of thermostat 24, A/D converter 26 is supplied with an analog voltage indicative of desired temperature set point.

Connected in series between supply voltage source 34 and ground 35 are a temperature sensitive resistor 36 and a fixed resistor 37. Thus A/D converter 27 is supplied with an analog voltage indicative of the sensed temperature in a temperature controlled space.

Microprocessor 25 functions to compare the digital outputs of A/D converters 26 and 27, and to provide a control signal to temperature control apparatus which is operable to bring the sensed temperature into agreement with the indicated temperature set point.

The applicants' invention permits a wide tolerance potentiometer 28–30 to be used in thermostat 24 while maintaining a standard desired orientation of scale 33 relative to the thermostat housing to provide acceptable human factors function and appearance. Specifically, the potentiometer may be mounted on a printed circuit board in the housing in an orientation which assumes an ideal linearity characteristic for the midpoint of the set point temperature range scale, i.e., 50% of the angular rotation corresponding to a 50% resistance ratio.

In practice, a test fixture may be provided which allows measuring and recording of the rotational angles versus resistance (or voltage) ratio for the physical 50% midpoint position of the wiper and at least one of the end points to be used for the temperature set point. The set point knob is attached to the potentiometer shaft so that the actual 50% resistance ratio corresponds to the knob position at which the pointer points to the location on the housing desired for the 50% midpoint of the scale. This eliminates any offset errors so that the ideal 50% set point matches the real 50% resistance ratio output of potentiometer. For example, with a 45° F. to 95° F. set point range, the 70° F. indicium would correspond to exactly the 50% resistance ratio of the potentiometer. This allows for improved human factors appearance in which the 70° F. indicium is horizontally oriented or at top or bottom dead center on all devices independent of the specific potentiometer incorporated therein.

Based on this fixed midpoint and having measured the actual rotational angles required to reach the resistance ratio(s) for the end point(s) of the set point scale, the slope of "mechanical degrees/temperature degrees" can be calculated. Since the relationship of the rotational angle versus degree, Fahrenheit is linear, the actual mechanical angle required for each intermediate degree Fahrenheit indicium in the set point range can be calculated precisely.

The housing can then be marked on the production line by printing, laser etching, or other suitable method to create a set point scale matched to the potentiometer used in that device. An on-line laser marking system, such as required for this operation is readily available, fast, precise and obtainable at a reasonable one-time only capital expense. While spacing between indicia on the scale may vary from device to device, the indicia would be uniformly spaced across the entire scale for any given thermostat, and would be symmetrically balanced around the midpoint to provide an attractive appearance.

Even if a particular potentiometer is somewhat nonlinear, additional resistance ratio versus angular position points can be measured and the temperature scale can be calculated as needed to match potentiometer characteristics.

In some applications, it may be desirable or required that the actual set point range be restricted to less than the full functional range of the thermostat. Such a requirement is easily accommodated in the applicants' manufacturing method approach. The mechanical positions of the set point range stops can be calculated once the specific potentiometer is measured on the production line for the set point scale marking. Range stop elements can be added, or positioned, as needed to match the thermostat characteristics. Further, since the set point range was not premarked on the housing, it can be marked on the housing to end at the stops rather than continuing to show the full set point range beyond the end stops.

In accordance with the foregoing description, the applicants have provided a manufacturing method whereby an inexpensive wide tolerance potentiometer can be used to control the set point for a controlled parameter, while visually indicating the set point on a scale having a desired standard orientation on the control device housing. Although a particular embodiment has been shown and described for illustrative purposes, various modifications and other embodiments within the applicants' teaching will be apparent to those of ordinary skill in the relevant arts. It is not intended that coverage be limited to the embodiment shown, but only by the terms of the following claims.

We claim:

1. A method of incorporating potentiometers having substantially linear resistance characteristics within a range of wiper positions, the resistance characteristics other than linearity being subject to unit-to-unit variations, into devices of the type in which the set point for a controlled parameter is determined by the position of the wiper on the resistance element of a potentiometer, and in which a movable element coupled to a wiper positioning member cooperates with a fixed-position element to indicate the set point, one of the movable and fixed-position elements being a scale, a further requirement being that a first predetermined indicium of the fixed-position element occupies substantially the same desired location on the device, from device-to-device, the method comprising the steps of:

determining a first wiper position at which the parameter is controlled to a first set point corresponding to the first predetermined indicium on the scale;

coupling the wiper positioning member to the potentiometer so that a movable element associated with the wiper positioning member is in a desired positional relationship with stationary parts of the device when the wiper is positioned to control the parameter to the set point corresponding to a first predetermined indicium on the scale; and marking the scale so that the first predetermined indicium thereon is at the desired location.

2. The method of claim 1 including the steps of:

determining the range of positions of the movable element coupled to the wiper positioning member corresponding to the desired range of set points for the controlled parameter; and marking the scale so that the spacing of indicia on the scale corresponds to a linear set point function with ends of the scale substantially coinciding with the ends of said range of positions of the movable element coupled to the wiper positioning member.

3. The method of claim 2 wherein the other of the movable and fixed-position elements is a pointer, including the further steps of:

determining a second wiper position at which the parameter is controlled to a second set point corresponding to a second predetermined indicium on the scale;

dividing the spacing between the locations on the scale to which the pointer points when the wiper is positioned to control the parameter to the first and second set points respectively by the difference in set point values between the first and second set points to compute scale indicia spacing; and marking the scale according to the computed scale indicia spacing for the complete range of set points for the controlled parameter.

4. The method of claim 3 wherein:

the first predetermined indicium on the scale is at substantially the mid point thereof; and the second predetermined indicium on the scale is at one end thereof.

5. In a control device of the type in which a controlled parameter set point is determined by the position of a wiper on a resistive element of a potentiometer, and in which the set point is indicated by a pointer on a wiper positioning member in cooperation with a fixed scale on the device, a method of marking the scale on the device in a desired orientation relative thereto, comprising the steps of:

mounting the potentiometer in the device in the orientation which would be consistent with the desired orientation of the scale, assuming ideal resistance characteristics of the potentiometer;

affixing the wiper positioning member to the potentiometer so that the pointer on said member points to the desired location of a first predetermined point on the scale when the wiper is positioned to provide the set point corresponding to said first predetermined point; and marking the scale on the device so that said first predetermined point on the scale is at the desired location.

6. The method of claim 5, assuming a potentiometer to have substantially linear resistance characteristics within a range of wiper positions, including the steps of:

identifying a subset of the range of wiper positions exhibiting substantially linear resistance characteristics such that the ratio of the resistance between one end of the resistive element and the wiper to the total resistance of the resistive element falls within a dynamic range of interest;

determining the location of a second point on the scale to which the pointer points when the wiper is positioned to achieve a resistance ratio at one of the limits of the dynamic range of interest;

calculating the locations on the scale of indicia corresponding to predetermined set points based on the locations of said first and second points; and marking the indicia of the scale on the device at the locations calculated therefor.

7. The method of claim 6 wherein said first predetermined point on the scale corresponds to the midpoint of the resistance ratio dynamic range of interest.

8. The method of claim 7 wherein the potentiometer is a rotary potentiometer.

9. The method of claim 8 wherein:

end stops are provided to limit the range of movement of the wiper; and the scale is marked so that it includes only indicia corresponding to wiper positions between the end stops.

* * * * *